US009921734B2

(12) United States Patent
Goldenberg et al.

(10) Patent No.: US 9,921,734 B2
(45) Date of Patent: Mar. 20, 2018

(54) CONTEXT-SENSITIVE VIEWS

(71) Applicant: Palantir Technologies Inc., Palo Alto, CA (US)

(72) Inventors: Joshua Goldenberg, Menlo Park, CA (US); Brian Ngo, San Francisco, CA (US); Bill Dwyer, Palo Alto, CA (US); Parvathy Menon, San Francisco, CA (US); Gregory Martin, Oakland, CA (US); Zach Bush, Palo Alto, CA (US); Allen Chang, Mountain View, CA (US); Mike Boland, McLean, VA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 15/398,092

(22) Filed: Jan. 4, 2017

(65) Prior Publication Data

US 2017/0115865 A1   Apr. 27, 2017

Related U.S. Application Data

(63) Continuation of application No. 14/242,559, filed on Apr. 1, 2014, now Pat. No. 9,557,882, which is a
(Continued)

(51) Int. Cl.
*G06F 3/0485* (2013.01)
*G06F 3/0484* (2013.01)
*G06F 3/0482* (2013.01)

(52) U.S. Cl.
CPC ........ *G06F 3/04855* (2013.01); *G06F 3/0482* (2013.01); *G06F 3/04845* (2013.01)

(58) Field of Classification Search
CPC . G06F 3/04855; G06F 3/0482; G06F 3/04845
(Continued)

(56) References Cited

U.S. PATENT DOCUMENTS 5,109,399 A   4/1992   Thompson
5,329,108 A   7/1994   Lamoure
(Continued)

FOREIGN PATENT DOCUMENTS

DE   102014103482   9/2014
DE   102014215621   2/2015
(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — David Phantana Angkool
(74) *Attorney, Agent, or Firm* — Knobbe Martens Olson & Bear LLP

(57) ABSTRACT

A context-sensitive viewing system is disclosed in which various data visualizations, also referred to a contextual views, of a common set of data may be viewed by a user on an electronic device. Data in the system may comprise data objects and associated properties and/or metadata, and may be stored in one or more electronic data stores. As a user of the system views and manipulates a first contextual view of a set of data objects, one or more other contextual views of the same set of data objects may be updated accordingly. Updates to the secondary contextual views may, in various embodiments, happen real-time. Further, the secondary contextual views may be visible to the user simultaneously with the primary contextual view. A user may switch from one view to another, and may manipulate data in any view, resulting in updates in the other views.

19 Claims, 11 Drawing Sheets

Related U.S. Application Data continuation of application No. 14/095,798, filed on Dec. 3, 2013, now Pat. No. 8,713,467.

(60) Provisional application No. 61/864,048, filed on Aug. 9, 2013.

(58) Field of Classification Search
USPC .......................................................... 715/781
See application file for complete search history.

(56) References Cited

U.S. PATENT DOCUMENTS

| | | |
|---|---|---|
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,397,177 B2 * | 3/2013 | Barros .................. G06F 3/0483 701/426 |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,689,108 B1 | 4/2014 | Duffield et al. |
| 8,713,467 B1 * | 4/2014 | Goldenberg .......... G06F 3/0481 715/716 |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |

(56) References Cited

U.S. PATENT DOCUMENTS

| | | | |
|---|---|---|---|
| 8,909,656 B2 * | 12/2014 | Kumar | G06F 17/30699 707/754 |
| 8,917,274 B2 | 12/2014 | Ma et al. | |
| 8,924,872 B1 | 12/2014 | Bogomolov et al. | |
| 8,937,619 B2 | 1/2015 | Sharma et al. | |
| 8,938,686 B1 | 1/2015 | Erenrich et al. | |
| 9,009,171 B1 | 4/2015 | Grossman et al. | |
| 9,009,827 B1 | 4/2015 | Albertson et al. | |
| 9,021,260 B1 | 4/2015 | Falk et al. | |
| 9,021,384 B1 * | 4/2015 | Beard | G06F 3/0481 382/105 |
| 9,043,696 B1 | 5/2015 | Meiklejohn et al. | |
| 9,043,894 B1 | 5/2015 | Dennison et al. | |
| 9,116,975 B2 * | 8/2015 | Shankar | G06F 17/30312 |
| 9,335,911 B1 * | 5/2016 | Elliot | G06F 17/30572 |
| 9,454,281 B2 * | 9/2016 | Ward | G06F 3/0481 |
| 9,454,785 B1 * | 9/2016 | Hunter | G06F 17/30522 |
| 9,557,882 B2 | 1/2017 | Goldenberg et al. | |
| 9,646,396 B2 * | 5/2017 | Sharma | G06T 11/206 |
| 9,727,560 B2 * | 8/2017 | Chakerian | G06F 17/30011 |
| 9,734,217 B2 * | 8/2017 | Kara | G06F 17/30554 |
| 9,741,138 B2 * | 8/2017 | Friedlander | G06T 11/206 |
| 9,767,172 B2 * | 9/2017 | Fackler | G06F 17/3056 |
| 9,779,525 B2 * | 10/2017 | Sharma | G06T 11/206 |
| 9,785,317 B2 * | 10/2017 | Duffield | G06Q 10/00 |
| 9,785,328 B2 * | 10/2017 | Slawinski | G06F 3/04847 |
| 9,785,773 B2 * | 10/2017 | Falk | G06F 21/56 |
| 2002/0033848 A1 | 3/2002 | Sciammarella et al. | |
| 2002/0091707 A1 | 7/2002 | Keller | |
| 2002/0095658 A1 | 7/2002 | Shulman | |
| 2002/0116120 A1 | 8/2002 | Ruiz et al. | |
| 2002/0130907 A1 | 9/2002 | Chi et al. | |
| 2002/0174201 A1 | 11/2002 | Ramer et al. | |
| 2002/0194119 A1 | 12/2002 | Wright et al. | |
| 2003/0028560 A1 | 2/2003 | Kudrolli et al. | |
| 2003/0039948 A1 | 2/2003 | Donahue | |
| 2003/0144868 A1 | 7/2003 | MacIntyre et al. | |
| 2003/0163352 A1 | 8/2003 | Surpin et al. | |
| 2003/0225755 A1 | 12/2003 | Iwayama et al. | |
| 2003/0229848 A1 | 12/2003 | Arend et al. | |
| 2004/0032432 A1 | 2/2004 | Baynger | |
| 2004/0064256 A1 | 4/2004 | Barinek et al. | |
| 2004/0085318 A1 | 5/2004 | Hassler et al. | |
| 2004/0095349 A1 | 5/2004 | Bito et al. | |
| 2004/0111410 A1 | 6/2004 | Burgoon et al. | |
| 2004/0126840 A1 | 7/2004 | Cheng et al. | |
| 2004/0143602 A1 | 7/2004 | Ruiz et al. | |
| 2004/0143796 A1 | 7/2004 | Lerner et al. | |
| 2004/0163039 A1 | 8/2004 | Gorman | |
| 2004/0181554 A1 | 9/2004 | Heckerman et al. | |
| 2004/0193600 A1 | 9/2004 | Kaasten et al. | |
| 2004/0221223 A1 | 11/2004 | Yu et al. | |
| 2004/0260702 A1 | 12/2004 | Cragun et al. | |
| 2005/0027705 A1 | 2/2005 | Sadri et al. | |
| 2005/0028094 A1 | 2/2005 | Allyn | |
| 2005/0039119 A1 | 2/2005 | Parks et al. | |
| 2005/0080769 A1 | 4/2005 | Gemmell | |
| 2005/0086207 A1 | 4/2005 | Heuer et al. | |
| 2005/0125715 A1 | 6/2005 | Di Franco et al. | |
| 2005/0162523 A1 | 7/2005 | Darrell et al. | |
| 2005/0180330 A1 | 8/2005 | Shapiro | |
| 2005/0182793 A1 | 8/2005 | Keenan et al. | |
| 2005/0183005 A1 | 8/2005 | Denoue et al. | |
| 2005/0246327 A1 | 11/2005 | Yeung et al. | |
| 2005/0251786 A1 | 11/2005 | Citron et al. | |
| 2006/0026120 A1 | 2/2006 | Carolan et al. | |
| 2006/0026170 A1 | 2/2006 | Kreitler et al. | |
| 2006/0059139 A1 | 3/2006 | Robinson | |
| 2006/0074881 A1 | 4/2006 | Vembu et al. | |
| 2006/0080619 A1 | 4/2006 | Carlson et al. | |
| 2006/0129746 A1 | 6/2006 | Porter | |
| 2006/0139375 A1 | 6/2006 | Rasmussen et al. | |
| 2006/0142949 A1 | 6/2006 | Helt | |
| 2006/0149596 A1 | 7/2006 | Surpin et al. | |
| 2006/0203337 A1 | 9/2006 | White | |
| 2006/0218637 A1 | 9/2006 | Thomas et al. | |
| 2006/0241974 A1 | 10/2006 | Chao et al. | |
| 2006/0242040 A1 | 10/2006 | Rader et al. | |
| 2006/0242630 A1 | 10/2006 | Koike et al. | |
| 2006/0271277 A1 | 11/2006 | Hu et al. | |
| 2006/0279630 A1 | 12/2006 | Aggarwal et al. | |
| 2007/0011150 A1 | 1/2007 | Frank | |
| 2007/0016363 A1 | 1/2007 | Huang et al. | |
| 2007/0038962 A1 | 2/2007 | Fuchs et al. | |
| 2007/0057966 A1 | 3/2007 | Ohno et al. | |
| 2007/0078832 A1 | 4/2007 | Ott et al. | |
| 2007/0083541 A1 | 4/2007 | Fraleigh et al. | |
| 2007/0150369 A1 | 6/2007 | Zivin | |
| 2007/0174760 A1 | 7/2007 | Chamberlain et al. | |
| 2007/0192265 A1 | 8/2007 | Chopin et al. | |
| 2007/0198571 A1 | 8/2007 | Ferguson et al. | |
| 2007/0208497 A1 | 9/2007 | Downs et al. | |
| 2007/0208498 A1 | 9/2007 | Barker et al. | |
| 2007/0208736 A1 | 9/2007 | Tanigawa et al. | |
| 2007/0240062 A1 | 10/2007 | Christena et al. | |
| 2007/0266336 A1 | 11/2007 | Nojima et al. | |
| 2007/0294643 A1 | 12/2007 | Kyle | |
| 2008/0040684 A1 | 2/2008 | Crump | |
| 2008/0051989 A1 | 2/2008 | Welsh | |
| 2008/0052142 A1 | 2/2008 | Bailey et al. | |
| 2008/0077597 A1 | 3/2008 | Butler | |
| 2008/0077642 A1 | 3/2008 | Carbone et al. | |
| 2008/0104019 A1 | 5/2008 | Nath | |
| 2008/0126951 A1 | 5/2008 | Sood et al. | |
| 2008/0155440 A1 | 6/2008 | Trevor et al. | |
| 2008/0195417 A1 | 8/2008 | Surpin et al. | |
| 2008/0195608 A1 | 8/2008 | Clover | |
| 2008/0222295 A1 | 9/2008 | Robinson et al. | |
| 2008/0263468 A1 | 10/2008 | Cappione et al. | |
| 2008/0267107 A1 | 10/2008 | Rosenberg | |
| 2008/0276167 A1 | 11/2008 | Michael | |
| 2008/0278311 A1 | 11/2008 | Grange et al. | |
| 2008/0288306 A1 | 11/2008 | MacIntyre et al. | |
| 2008/0301643 A1 | 12/2008 | Appleton et al. | |
| 2009/0002492 A1 | 1/2009 | Velipasalar et al. | |
| 2009/0027418 A1 | 1/2009 | Maru et al. | |
| 2009/0030915 A1 | 1/2009 | Winter et al. | |
| 2009/0055251 A1 | 2/2009 | Shah et al. | |
| 2009/0076845 A1 | 3/2009 | Bellin et al. | |
| 2009/0088964 A1 | 4/2009 | Schaaf et al. | |
| 2009/0119309 A1 | 5/2009 | Gibson et al. | |
| 2009/0125369 A1 | 5/2009 | Kloostra et al. | |
| 2009/0125459 A1 | 5/2009 | Norton et al. | |
| 2009/0132921 A1 | 5/2009 | Hwangbo et al. | |
| 2009/0132953 A1 | 5/2009 | Reed et al. | |
| 2009/0144262 A1 | 6/2009 | White et al. | |
| 2009/0144274 A1 | 6/2009 | Fraleigh et al. | |
| 2009/0164934 A1 | 6/2009 | Bhattiprolu et al. | |
| 2009/0171939 A1 | 7/2009 | Athsani et al. | |
| 2009/0172511 A1 | 7/2009 | Decherd et al. | |
| 2009/0177962 A1 | 7/2009 | Gusmorino et al. | |
| 2009/0179892 A1 | 7/2009 | Tsuda et al. | |
| 2009/0222400 A1 | 9/2009 | Kupershmidt et al. | |
| 2009/0222760 A1 | 9/2009 | Halverson et al. | |
| 2009/0234720 A1 | 9/2009 | George et al. | |
| 2009/0249244 A1 | 10/2009 | Robinson et al. | |
| 2009/0281839 A1 | 11/2009 | Lynn et al. | |
| 2009/0287470 A1 | 11/2009 | Farnsworth et al. | |
| 2009/0292626 A1 | 11/2009 | Oxford | |
| 2010/0011282 A1 | 1/2010 | Dollard et al. | |
| 2010/0042922 A1 | 2/2010 | Bradateanu et al. | |
| 2010/0057716 A1 | 3/2010 | Stefik et al. | |
| 2010/0070523 A1 | 3/2010 | Delgo et al. | |
| 2010/0070842 A1 | 3/2010 | Aymeloglu et al. | |
| 2010/0070845 A1 | 3/2010 | Facemire et al. | |
| 2010/0070897 A1 | 3/2010 | Aymeloglu et al. | |
| 2010/0100963 A1 | 4/2010 | Mahaffey | |
| 2010/0103124 A1 | 4/2010 | Kruzeniski et al. | |
| 2010/0114887 A1 | 5/2010 | Conway et al. | |
| 2010/0122152 A1 | 5/2010 | Chamberlain et al. | |
| 2010/0131457 A1 | 5/2010 | Heimendinger | |
| 2010/0162176 A1 | 6/2010 | Dunton | |
| 2010/0191563 A1 | 7/2010 | Schlaifer et al. | |
| 2010/0198684 A1 | 8/2010 | Eraker et al. | |

(56) References Cited

U.S. PATENT DOCUMENTS

| | | |
|---|---|---|
| 2010/0199225 A1 | 8/2010 | Coleman et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0185316 A1 | 7/2011 | Reid et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0238553 A1 | 9/2011 | Raj et al. |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1* | 9/2012 | Dror ............... G06F 17/50 707/722 |
| 2012/0254129 A1 | 10/2012 | Wheeler et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006725 A1 | 1/2013 | Simanek et al. |
| 2013/0018796 A1 | 1/2013 | Kolhatkar et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0097482 A1 | 4/2013 | Marantz et al. |
| 2013/0101159 A1 | 4/2013 | Chao et al. |
| 2013/0110822 A1 | 5/2013 | Ikeda et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0157234 A1 | 6/2013 | Gulli et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0068487 A1 | 3/2014 | Steiger et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0164966 A1* | 6/2014 | Kim ............... G06F 3/04886 715/769 |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0267294 A1 | 9/2014 | Ma |
| 2014/0267295 A1 | 9/2014 | Sharma |
| 2014/0279824 A1 | 9/2014 | Tamayo |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2015/0019394 A1 | 1/2015 | Unser et al. |
| 2015/0046870 A1 | 2/2015 | Goldenberg et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2016/0188143 A1* | 6/2016 | Kohlmeier ...... G06F 17/30657 715/753 |

FOREIGN PATENT DOCUMENTS

| | | |
|---|---|---|
| EP | 1672527 | 6/2006 |
| EP | 2551799 | 1/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |

(56) References Cited

FOREIGN PATENT DOCUMENTS

| | | |
|---|---|---|
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 2005/104736 | 11/2005 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
Acklen, Laura, "Absolute Beginner's Guide to Microsoft Word 2003," Dec. 24, 2003, pp. 15-18, 34-41, 308-316.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

"The FASTA Program Package," fasta-36.3.4, Mar. 25, 2011, pp. 29.
GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-

(56) References Cited

OTHER PUBLICATIONS and-glue-connectors-with-the-connector-tool-HA010048532. aspx?CTT=1> printed Aug. 4, 2011 in 1 page.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents", 6 pages, 2002.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palmas et al., "An Edge-Bunding Layout for Interactive Parallel Coordinates" 2014 IEEE Pacific Visualization Symposium, pp. 57-64.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Rouse, Margaret, "OLAP Cube," <http://searchdatamanagement.techtarget.com/definition/OLAP-cube>, Apr. 28, 2012, pp. 16.
Sigrist, et al., "Prosite, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Umagandhi et al., "Search Query Recommendations Using Hybrid User Profile with Query Logs," International Journal of Computer Applications, vol. 80, No. 10, Oct. 1, 2013, pp. 7-18.
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues", A129, pp. 859-864, 2001.
IBM—i2 Integrated Law Enforcement, https://www-03.ibm.com/software/products/en/integrated-law-enforcement, as printed Feb. 15, 2017 in 2 pages.
IBM—i2 Analyze, https://www-03.ibm.com/software/products/en/i2-analyze, as printed Feb. 15, 2017 in 2 pages.
IBM—Data analysis—i2 Analyst's Notebook, http://www-03.ibm.com/software/products/en/analysts-notebook, as printed Feb. 16, 2017 in 2 pages.
Visual Analysis, "Overview of merging timeline charts and creating hybrid charts," available at https://www.youtube.com/watch?v=dl6jzNtEVpA, as published on Mar. 9, 2015.
IBM Analytics, "IBM i2 Intelligence Analysis Portfolio Overview," available at https://www.youtube.com/watch?v=ElFu_oUiaBY, as published on Sep. 24, 2015.
i2—An IBM Company, "IBM i2 Intelligent Law Enforcement Demo," available at https://www.youtube.com/watch?v=_KCXZ2iTMXQ, as published on Dec. 3, 2012.
Yair Shaked, "IBM i2 Enterprise Insight Analysis—cyber Demo," available at https://www.youtube.com/watch?v=ZXmTWKqkfF4, as published on Nov. 19, 2015.
Visual Analysis, "Overview of importing data and creating timelines," available at https://www.youtube.com/watch?v=SovxKrvkZZs, as published on Mar. 9, 2015.
IBM Corporation, "IBM i2 Analyst's Notebook," Aug. 2015, in 4 pages.
IBM Corporation, "IBM i2 Analyst's Notebook Connector for Esri," May 2012, in 3 pages.
IBM Corporation, "IBM i2 Enterprise Insight Analysis V2.0 delivers a modern contextual user interface and enhanced software operational warehouse support," http://www-01.ibm.com/common/ssi/ShowDoc.wss?docURL=/common/ssi/rep_ca/2/897/ENUS215-302/index.html&lang=en&request_locale=en, as published on Sep. 1, 2015.
IBM Support, "Software lifecycle—i2 Analyst's Notebook Premium 9.0.0," https://www-01.ibm.com/software/support/lifecycleapp/PLCDetail.wss?q45=I570331B72886X86, as printed Mar. 7, 2017 in 1 page.
IBM Support, "Software lifecycle—i2 Enterprise Insight Analysis 2.0.0," https://www-01.ibm.com/software/support/lifecycleapp/PLCDetail.wss?q45=E170786H45496153, as printed Mar. 7, 2017 in 1 page.
i2 A ChoicePoint Company, "i2 Analyst's Notebook 7 User Guide: Creating Charts" Jun. 2007, 373 pages.
Gatewaynews, "New Crime Fighting Tool 'Coplink'" available at https://www.youtube.com/watch?v=GbU6E0grnTw, as published on Mar. 8, 2008.
COPLINK, "Incident Analyzer User Guide," created Nov. 5, 2010 (as indicated by the PDF file metadata), 14 pages.
Notice of Allowance for U.S. Appl. No. 14/242,559 dated Oct. 3, 2016.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/616,080 dated Apr. 2, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14186225.0 dated Feb. 13, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.

(56) References Cited

OTHER PUBLICATIONS

Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14199182.8 dated Mar. 13, 2015.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2013306 dated Apr. 24, 2015.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 13/247,987 dated Apr. 2, 2015.
Official Communication for U.S. Appl. No. 13/831,791 dated Mar. 4, 2015.
Official Communication for U.S. Appl. No. 13/835,688 dated Jun. 17, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Feb. 27, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,147 dated Feb. 19, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Sep. 9, 2014.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Mar. 31, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/579,752 dated May 26, 2015.
Official Communication for U.S. Appl. No. 14/639,606 dated May 18, 2015.

* cited by examiner

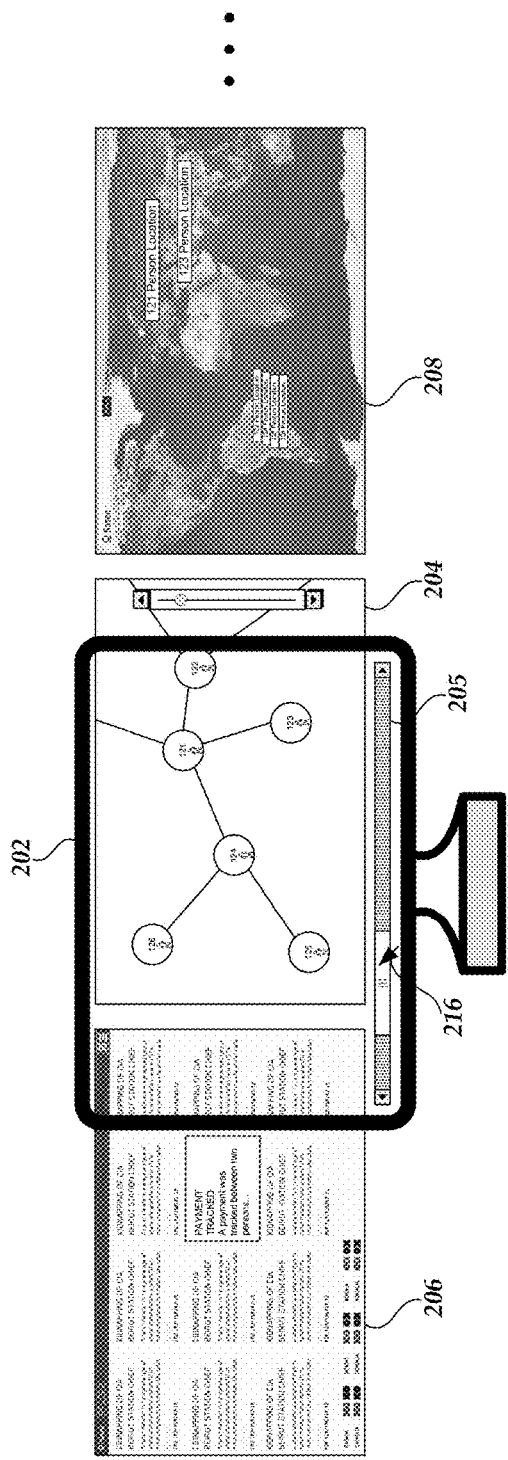
FIG. 2B
FIG. 2C
FIG. 2D

CONTEXT-SENSITIVE VIEWS

CROSS-REFERENCE TO RELATED APPLICATIONS

This application is a continuation of U.S. application Ser. No. 14/242,559, filed Apr. 1, 2014, and titled "CONTEXT-SENSITIVE VIEWS," which is a continuation of U.S. application Ser. No. 14/095,798, filed Dec. 3, 2013, and titled "CONTEXT-SENSITIVE VIEWS," which application claims a priority benefit under 35 U.S.C. § 119 to U.S. Provisional Patent Application No. 61/864,048, filed on Aug. 9, 2013, and titled "CONTEXT-SENSITIVE VIEWS". All of the above-identified applications are hereby incorporated by reference herein in their entireties.

TECHNICAL FIELD

The present disclosure relates to systems and techniques for data integration, analysis, and visualization. More specifically, the present disclosure relates to integration, analysis, and visualization of data objects in various contextual views.

BACKGROUND

Visualizations may enable faster and more thorough understandings of sets of data and information. Such visualizations of data and other information may be referred to as data visualizations. Data visualizations may, for example, visually transform and/or restructure data so as to provide new perspectives to a viewer of the visualization. A particular type of data visualization may be referred to as a contextual view. Examples of data visualizations include graphs, maps, tables, and/or lists, among others. Data visualizations may include displaying individual pieces of data in, for example, various arrangements, various sizes, various colors, and/or may include multi-dimensional aspects.

SUMMARY

The systems, methods, and devices described herein each have several aspects, no single one of which is solely responsible for its desirable attributes. Without limiting the scope of this disclosure, several non-limiting features will now be discussed briefly.

A context-sensitive viewing system is disclosed in which various data visualizations, also referred to a contextual views, of a common set of data may be viewed by a user on an electronic device. Data in the context-sensitive viewing system may comprise data objects and associated properties and/or metadata. As a user of the system views and manipulates a first contextual view of a set of data objects, one or more other contextual views of the same set of data objects may be updated accordingly.

In various embodiments, a user of the context-sensitive viewing system may switch from a primary contextual view to a secondary contextual view, thereby making the switched-to contextual view the new primary contextual view. Data objects may be manipulated in any view, resulting in updates in the other views. Context switching may be accomplished through inputs from the user. For example, the user may click on a preview of a secondary view, and/or may scroll from one view to the next.

The context-sensitive viewing system advantageously enables a user to view a particular set of data objects in multiple visualization contexts. Previews of the set of data in other visualization may be quickly reviewed by the user to determine the most beneficial context for information extraction. Further, manipulations by the user in one context are propagated to the other contexts, allowing fast analysis of the impacts of changes to the set of data.

In an embodiment, a computer system is disclosed comprising one or more hardware processors in communication with a computer readable medium storing software modules including instructions that are executable by the one or more hardware processors, the software modules including at least: an electronic database configured to store a plurality of data objects and properties associated with each of the data objects; and a context viewing module configured to: generate a primary contextual view including a visualization of a set of data objects and associated properties; generate one or more secondary contextual views, each secondary contextual view including respective secondary visualizations of the set of data objects; receive a user input modifying the primary contextual view; and in response to receiving a user input modifying the primary contextual view, modify one or more of the secondary contextual views based at least in part on the user input.

According to an aspect, the context viewing module may be further configured to: in response to receiving a user input modifying the primary contextual view, determine which of the one or more of the secondary contextual views to modify.

According to an aspect, modifying one or more of the secondary contextual views may comprise modifying all of the one or more secondary contextual view.

According to an aspect, modifying one or more of the secondary contextual views may comprise modifying any of the one or more secondary contextual views that are currently viewable by a user.

According to an aspect, modifying one or more of the secondary contextual views may comprise modifying any of the one or more secondary contextual views that are immediately adjacent to the primary contextual view.

According to an aspect, each of the visualization and/or the secondary visualizations may include at least one of a graph, a map, a table, a timeline, a histogram, a list, a reader interface, or a postboard interface.

According to an aspect, the one or more secondary contextual views may comprise contextual previews.

According to an aspect, the one or more secondary contextual views may be viewable in a drawer or scrollbar on a user interface, and the one or more secondary contextual views may be selectable by a user.

According to an aspect, the one or more secondary contextual views may be substantially the same size as the primary contextual view.

According to an aspect, the one or more secondary contextual views may be configured to be accessible by a user through the use of a scrollbar.

According to an aspect, the scrollbar may include at least one of tick marks indicating the locations of the one or more secondary views or contextual previews accessible in pop up windows.

According to an aspect, the one or more secondary contextual views may be positioned laterally to the primary contextual view, and the secondary contextual views may be accessible by a user through a user input including at least one of a mouse cursor or a touch input.

According to an aspect, a user input modifying the primary contextual view may comprise at least one of adding data objects, removing data objects, modifying data objects, moving data objects, modifying properties associated with data objects, or modifying and/or manipulating links between data objects.

In an embodiment, a computer system is disclosed comprising one or more hardware processors in communication with a computer readable medium storing software modules including instructions that are executable by the one or more hardware processors, the software modules including at least: a context viewing module configured to: display a first data visualization of a set of data objects and properties associated with data objects of the set of data objects; provide one or more secondary data visualizations of the set of data objects; receive a user input modifying the first data visualization; and in response to receiving a user input modifying the first data visualization, implement modifications to at least some of the one or more secondary data visualizations based at least in part on the user input.

According to an aspect, the context viewing module may be further configured to: in response to receiving a user input modifying the modifying the first data visualization, determine which of the one or more of the secondary data visualizations are currently displayed to the user, and implement modifications to the determined secondary data visualizations based at least in part on the user input.

According to an aspect, the context viewing module may be further configured to: in response to receiving a user input modifying the modifying the first data visualization, determine which of the one or more of the secondary data visualizations are adjacent to the first data visualization, and implement modifications to the determined secondary data visualizations based at least in part on the user input.

In an embodiment, a computer-implemented method of updating multiple contextual views is disclosed, the method comprising: providing an electronic database configured to store a plurality of data objects and metadata associated with each of the plurality of data objects; generating, by a computing system having one or more computer processors, based at least in part on the plurality of data objects and associated metadata, a primary contextual view and one or more secondary contextual views; receiving, via an input device of the computing system, a user input modifying the primary contextual view; determining, by the computing system, based on the received user input, modifications of the one or more secondary contextual views that correspond to the modification of the primary contextual view; modifying at least some of the one or more secondary contextual views based on the determined modifications.

According to an aspect, the method may further comprise providing, on an electronic display of the computing system, the generated primary contextual view and one or more of the secondary contextual views in a preview drawer.

According to an aspect, the method may further comprise providing, on an electronic display of the computing system, the generated primary contextual view; and providing, on the electronic display of the computer system, a scrollbar that enables a user to scroll to any of the one or more of the secondary contextual views and view any of the one or more of the secondary contextual views on the electronic display.

According to an aspect, modifying at least some of the one or more secondary contextual views based on the determined modifications may comprise modifying any secondary contextual views that are immediately viewable by a user.

BRIEF DESCRIPTION OF THE DRAWINGS

FIGS. 2A and 2B illustrate another user interface of the context-sensitive viewing system including multiple contextual views, according to embodiments of the present disclosure.

FIGS. 2C and 2D illustrate scrollbar aspects of user interfaces of the context-sensitive viewing system, according to embodiments of the present disclosure.

DETAILED DESCRIPTION OF SPECIFIC EMBODIMENTS

Overview

Figure 1A:
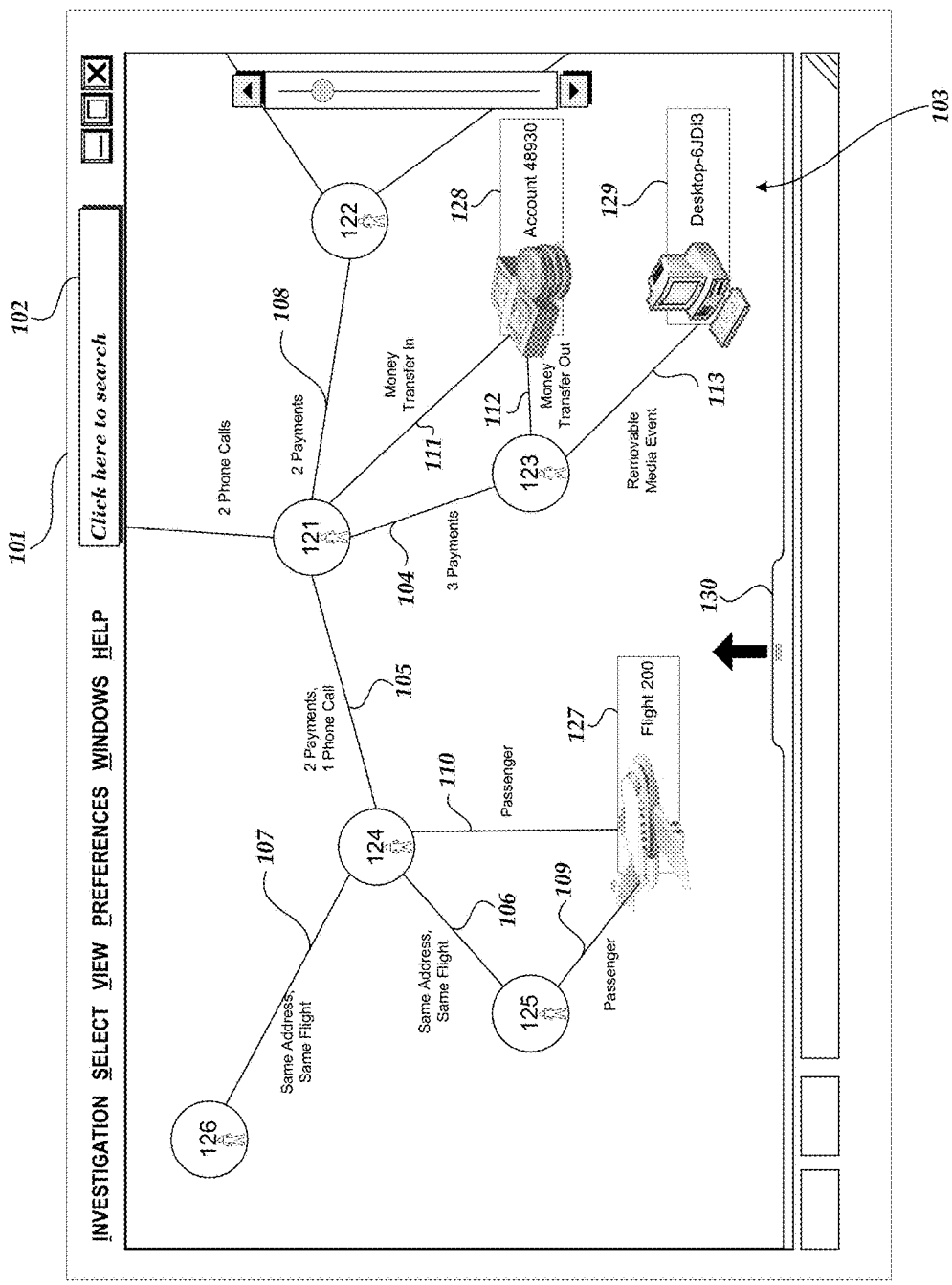
FIG. 1A illustrates a user interface of a context-sensitive viewing system, including relationships described in a data store using a dynamic ontology, according to an embodiment of the present disclosure.

A context-sensitive viewing system is disclosed in which various data visualizations, also referred to a contextual views, of a common set of data may be viewed by a user on an electronic device. Data in the context-sensitive viewing system may comprise data objects and associated properties and/or metadata, and may be stored in one or more electronic data stores. As a user of the system views and manipulates a first contextual view (also referred to as the "primary contextual view") of a set of data objects, one or more other contextual views (also referred to as "secondary contextual views") of the same set of data objects may be updated accordingly.

Updates to the secondary contextual views may, in various embodiments, happen real-time or may happen upon the occurrence of a triggering event (for example, a user input). In various embodiments, the secondary contextual views may comprise previews and/or thumbnails. Further, the secondary contextual views may be visible to the user simultaneously with the primary contextual view. For example, the user of the context-sensitive viewing system may view a particular set of data objects in multiple visualization contexts. Further, as the user updates the set of data objects in one context, the set of data objects may automatically be updated in one or more secondary contexts.

For the sake of brevity, contextual views may be referred to herein simply as "views" or "contexts." For example, a primary contextual view may be referred to as a "primary view." Additionally, the terms "contextual view" and "data visualization" may be used interchangeably.

In various ways and in various embodiments, a user of the context-sensitive viewing system may switch from a primary contextual view to a secondary contextual view, thereby making the switched-to contextual view the new primary contextual view. Data objects may be manipulated in any view, resulting in updates in the other views. Context switching may be accomplished through inputs from the user. For example, the user may click on a preview of a secondary view, and/or may scroll from one view to the next.

Examples of contextual views (and/or data visualizations) of the context-sensitive viewing system include, but are not limited to graphs, maps, tables, timelines, histograms, and/or lists, among other types of data visualizations. In an embodiment, a contextual view comprises a graph of connected data objects as described below. In an embodiment, a contextual view comprises an interactive mapping application, an example of which is described in U.S. patent application Ser. No. 13/917,571 filed on Jun. 13, 2013, and titled "Interactive Geospatial Map," which is hereby incorporated by reference herein in its entirety and for all purposes. In an embodiment, a contextual view comprises a reader interface that enables a user to review large amounts of notes and other textual information. An example of such a reader interface is described in U.S. Provisional Patent Application No. 61/863,792, filed on Aug. 8, 2013, and titled "Cable Reader Labeling,", which is hereby incorporated by reference herein in its entirety and for all purposes. In an embodiment, a contextual view comprises a postboard view in which notes and textual clips may be listed, an example of which is described in U.S. Provisional Patent Application No. 61/863,814, filed on Aug. 8, 2013, and titled "Cable Reader Snippets and Postboard," which is hereby incorporated by reference herein in its entirety and for all purposes. In an embodiment, a contextual view comprises a time series graph, timeline, and/or histogram, examples of which are described in U.S. Pat. No. 8,280,880, titled "Generating Dynamic Date Sets That Represent Market Conditions," and U.S. Pat. No. 8,280,880, titled "Filter Chains With Associated Views For Exploring Large Data Sets," each of which is hereby incorporated by reference herein in its entirety and for all purposes.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. The definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Contextual view, context, view, data representation: A visual representation of data that may include various organizations, transformations, and/or restructuring of data so as to provide new perspectives to a viewer of the visualization. Examples of contexts include graphs, maps, tables, timelines, histograms, and/or lists, among others. Contextual views may include displaying individual pieces of data in, for example, various arrangements, various sizes, various colors, and/or may include multi-dimensional aspects. Contextual views may enable faster and more thorough understandings of sets of data and information.

Example User Interfaces

FIG. 1A illustrates a user interface 101 of a context-sensitive viewing system, according to an embodiment of the present disclosure. The user interface 101 may be displayed on, for example, an electronic display of the system, such as client device 402 of FIG. 4. Further, as is described in detail below, a user may provide inputs to the system through, for example, a mouse and pointer or through a touch interface.

The example user interface 101 includes a particular graphical contextual view and/or data visualization 103 of various data objects and relationships between those data objects. In the example user interface 101 of FIG. 1A, a single contextual view is provided that shows, properties, data objects, and links/relationships between the data objects using a graphical user interface (GUI). The data objects shown on the user interface 101 include, for example, person objects 121, 122, 123, 124, 125, and 126; a flight object 127; a financial account 128; and a computer object 129. The data objects are represented by nodes. The relationships and/or links between the various data objects of user interface 101 are represented by lines, and include links 104, 105, 106, 107, 108, 109, 110, 111, 112, and 113.

In this example contextual view 103, each person node (associated with person data objects), flight node (associated with flight data objects), financial account node (associated with financial account data objects), and computer node (associated with computer data objects) may have relationships and/or links with any of the other nodes through, for example, other objects such as payment objects. As is described in detail in reference to FIGS. 4A and 4B below, the various data objects, data object properties, and/or relationships among those data objects and properties may be stored in, and retrieved from, one or more data stores and/or databases. As is further described in detail in reference to FIGS. 5 and 6 below, the data objects data object properties, and/or relationships may be stored using a dynamic ontology.

Turning back to FIG. 1A, various example relationships between data objects are represented. For example, relationship 104 is based on a payment associated with the individuals indicated in person data objects 121 and 123. The link 104 represents these shared payments (for example, the individual associated with data object 121 may have paid the individual associated with data object 123 on three occasions). The relationship is further indicated by the common relationship between person data objects 121 and 123 and financial account data object 128. For example, link 111 indicates that person data object 121 transferred money into financial account data object 128, while person data object 123 transferred money out of financial account data object 128. In another example, the relationships between person data objects 124 and 125 and flight data object 127 are indicated by links 106, 109, and 110. In this example, person data objects 124 and 125 have a common address and were passengers on the same flight data object 127. In an embodiment, further details related to the relationships between the various objects may be displayed. For example, links 111 and 112 may, in some embodiments, indicate the timing of the respective money transfers. In another example, the time of the flight associated with the flight data object 127 may be shown.

Relationships between data objects may be stored as links, or in some embodiments, as properties, where a relationship may be detected between the properties. In some cases the links may be directional. For example, a payment link may have a direction associated with the payment, where one person object is a receiver of a payment, and another person object is the payer of payment.

In addition to visually showing graphical data visualization 103, the user interface 101 may allow various manipulations. For example, the various data objects of the context-sensitive viewing system may be searched using a search interface 102 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. Further, the various data objects represented in the data visualization 103 may be moved, accessed, deleted from the interface, among other manipulations. Additional data objects and associated links may be added to the data visualization 103, and exiting data objects and links may be edited and/or otherwise altered.

The user interface 101 further includes a user-accessible drawer 130. The drawer 130 may be opened or closed by a user of the context-sensitive viewing system. The drawer 130 is shown in a closed state in FIG. 1A. As indicated by an upward pointing arrow, the drawer 130 may be opened by a user clicking and dragging the drawer open and/or touching and pulling the drawer open, as show in FIG. 1B.

Figure 1B:
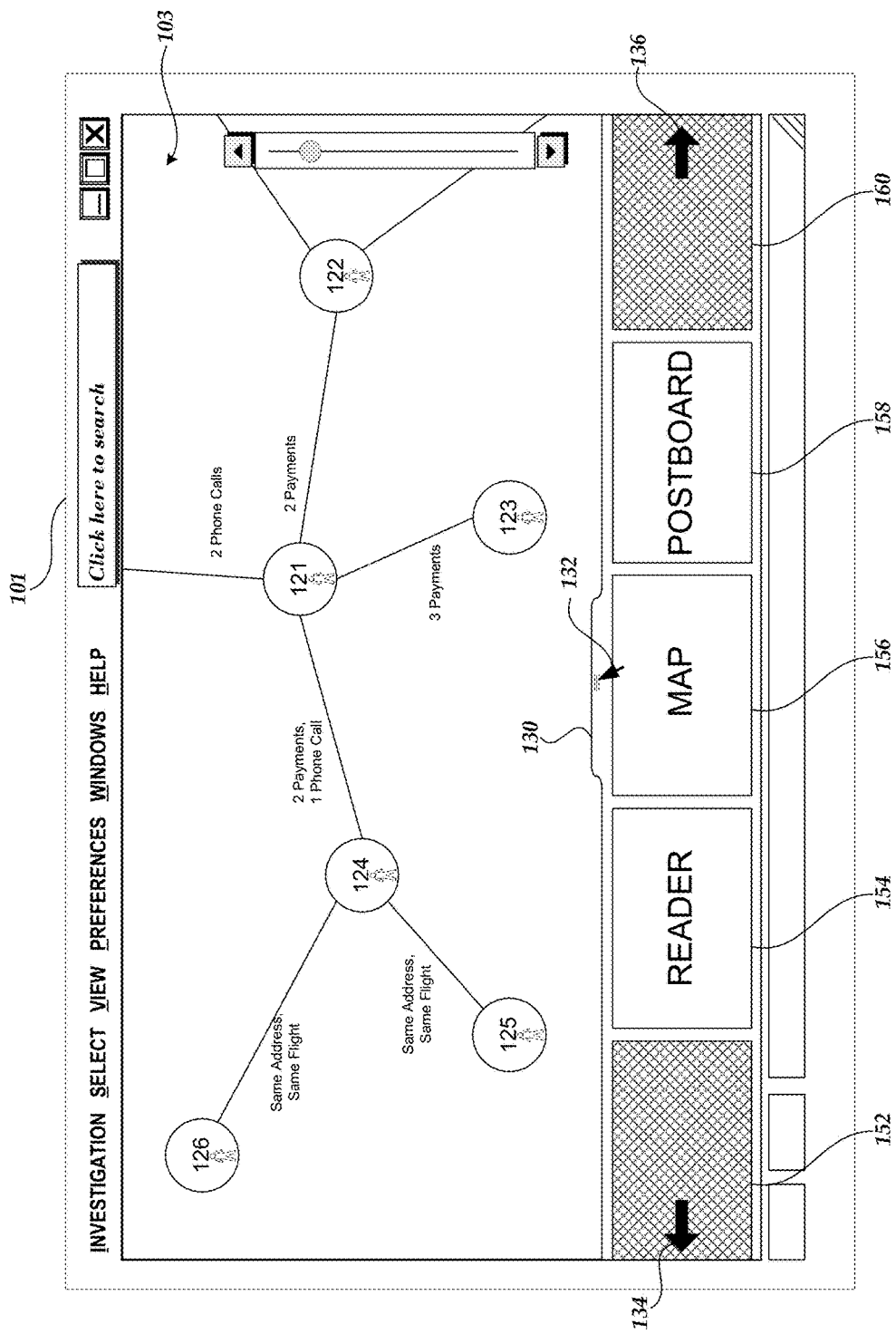
FIG. 1B illustrates a user interface of the context-sensitive viewing system including an expanded drawer with various contextual views, according to an embodiment of the present disclosure.

FIG. 1B illustrates the user interface 101 of the context-sensitive viewing system including an expanded drawer with various contextual views, according to an embodiment of the present disclosure. While including many of the same objects as FIG. 1A, the graphical data visualization 103 of FIG. 1B is simplified for the sake of clarity. As shown, the user has used the mouse pointer 132 to pull open the drawer 130, revealing the contents of the drawer. The drawer 130 includes indications of various available contextual views 152, 154, 156, 158, and 160. Arrows 134 and 136 indicate that, in some embodiment, additional indications of available views may extend beyond those that are currently visible. A user of the context-sensitive viewing system may, in an embodiment, scroll through the indications of views.

In the user interface 101 of FIG. 1B, view indicators include reader view 154, map view 156, and postboard view 158. A user may click on or otherwise select one of the indicators 154, 156, or 158. Selecting one of the views has the effect of changing from the current primary graphical data visualization 103 to the selected view. When the user changes to a different view, the same underlying data set (including data objects, properties, links, and the line) will be used in generating the new view. For example, the user may select the "map" indicator 156, at which point graphical data visualization 103 would be replaced with a map contextual view in which the same data objects (121, 122, 123, 124, 125, 126) may, for example, be placed on the map based on location data associated with the respective data objects.

Figure 1C:
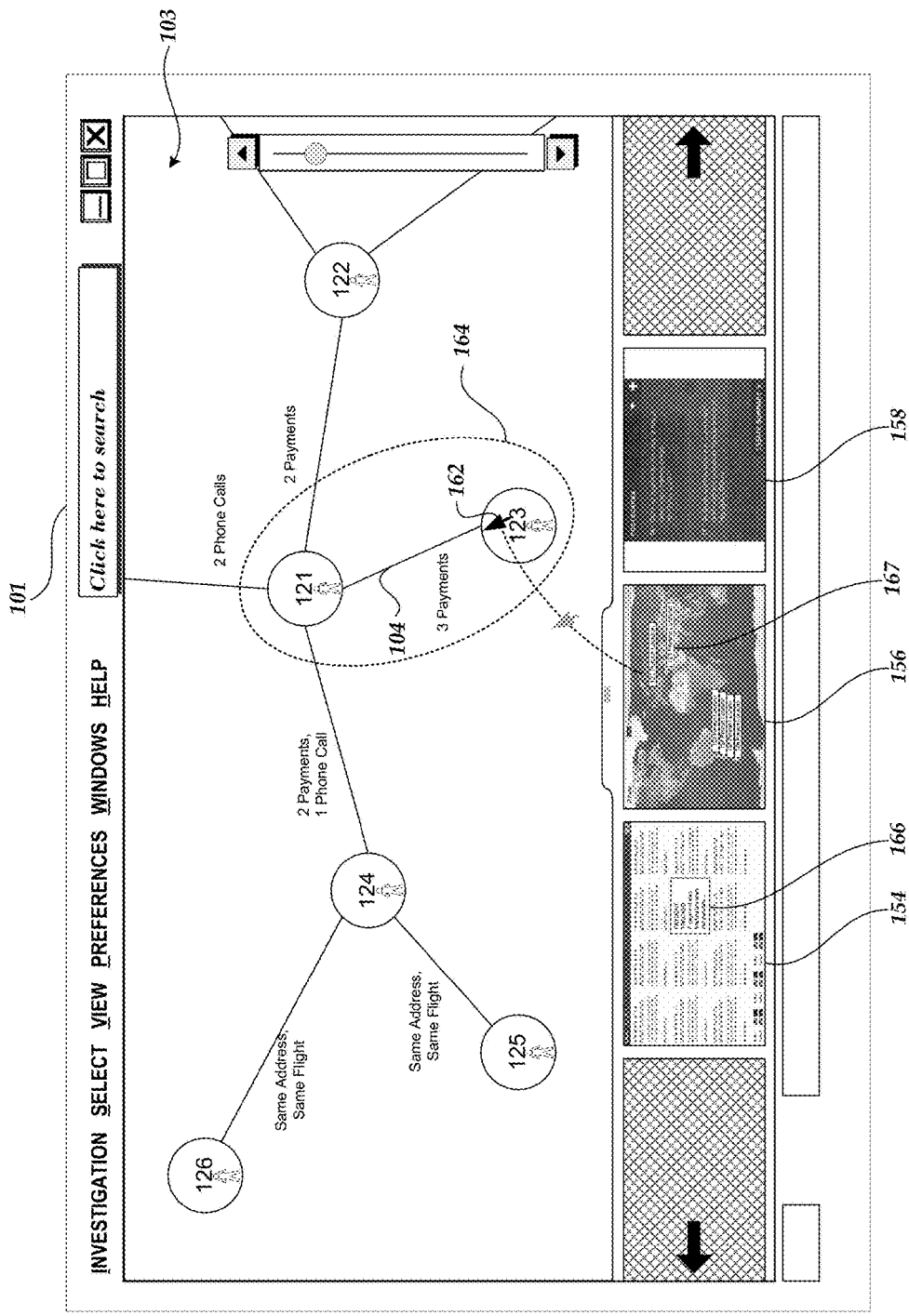
FIGS. 1C and 1D illustrate user interfaces of the context-sensitive viewing system in which selected data objects are updated in various contextual views, according to embodiments of the present disclosure.

In an embodiment, the user may provide an input that causes the indicators 152, 154, 156, 158, 160 to be replaced with previews of the respective contexts (as shown in FIG. 1C). In another embodiment, when the user opens the drawer 130, previews of the respective contexts may be provided automatically.

FIG. 1C illustrates the user interface 101 of the context-sensitive viewing system in which selected data objects are updated in various contextual views, according to an embodiment of the present disclosure. As shown in FIG. 1C, previews and/or thumbnails 154, 156, 158 are provided giving the user a preview of the current data in a reader, map, and postboard context, respectively. The context previews 154, 156, 158 include actual information derived from the data objects currently viewed in the graphical contextual view 103. For example, the map context preview 156 includes the locations of the various person data objects plotted on the map (see, for example, 123 person location 167). The reader context preview 154 includes cables and/or notes related to the data objects and/or links currently shown in the graphical contextual view 103 (see, for example, payment tracked information 166). The postboard context preview 158 includes clippings and/or other user-generated notes associated with the data objects. In various embodiments other contextual previews may be displayed to the user.

As described below in reference to FIG. 3, in various embodiments, the contextual previews may be generated and/or updated when the user opens the drawer 130, before the user opens the drawer 130, when particular previews become visible to the user, when any (or certain) changes are made to one of the views, or at various other times. In some embodiments, one or more contextual views or previews may be updated based on particular criteria, for example, whether the view/preview is visible to the user, whether the view/preview is adjacent to one visible by the user, and the like.

FIG. 1C additionally shows that, in some embodiments, a preview may be updated when the user drags selected objects onto the preview itself. In the example of FIG. 1C, the user has made selection 164, including data objects 121 and 122. Using mouse cursor 162, the user drags the selected objects to the map context preview 156, at which point the map context preview is updated to include the selected objects.

Figure 1D:
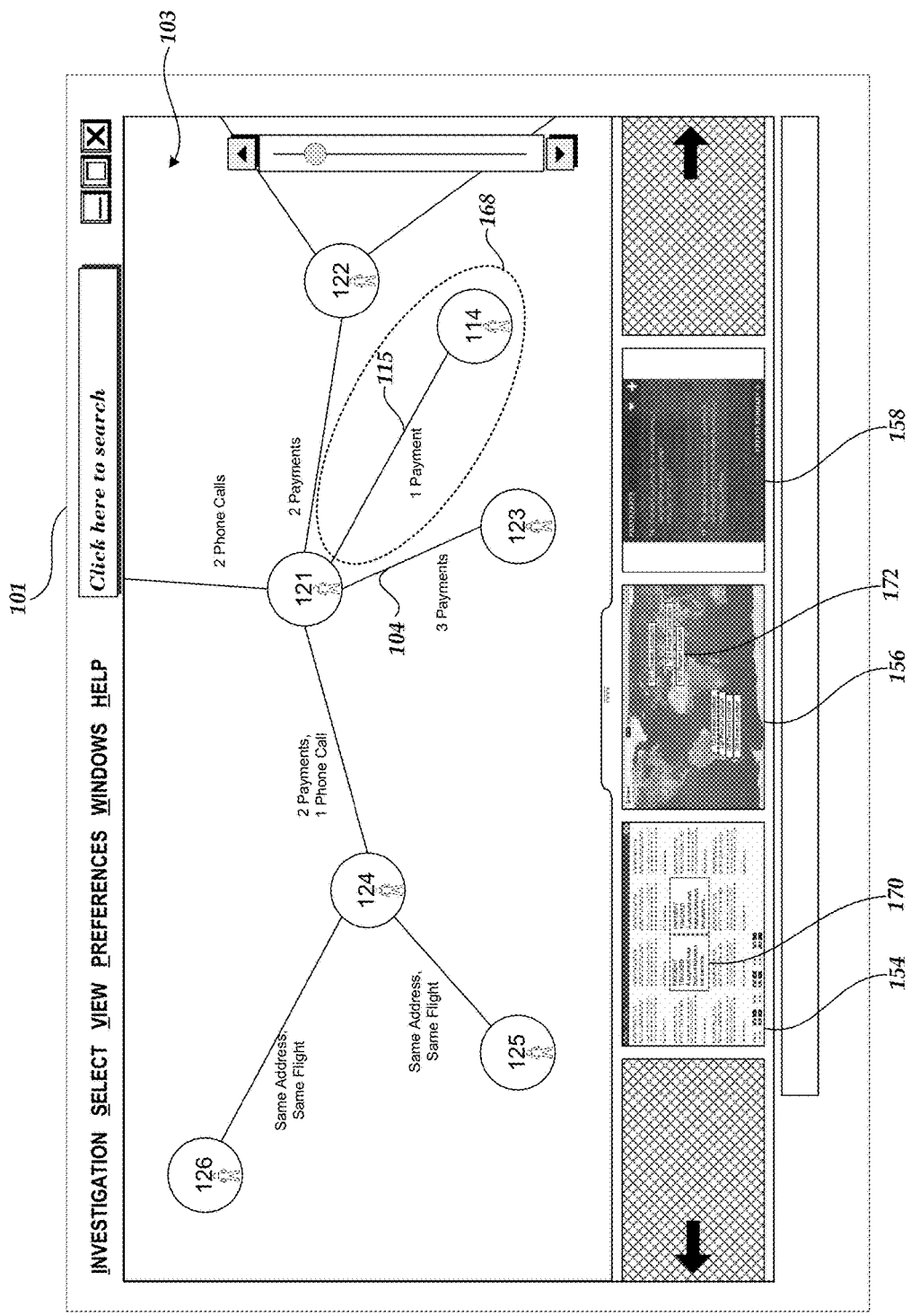

FIG. 1D illustrates the user interface 101 of the context-sensitive viewing system in which added data objects are updated in various contextual views, according to an embodiment of the present disclosure. In the embodiment of FIG. 1D, the user has added person data object 114 to the graphical context/data visualization 103. The added data object 114 includes a link 115 to person data object 121, indicating a payment took place between the objects. By adding the data object 114, the three contextual previews 154, 156, and 158 are automatically updated to reflect the new data object. For example, a location 172 associated with data object 114 is added to the map preview 156, while information 170 regarding the payment link 115 is added to the reader preview 154.

In various embodiments other types of contextual previews may be provided. For example, a timeline context may be provided in which the various event associated with the data objects of graphical primary contextual view 103 may be mapped. In various embodiments, any other types of changes to the primary contextual view may be reflected in the secondary contextual views/previews. For example, removing data object, editing data objects or properties, and the like.

In various embodiments, the drawer 130 may appear at different locations on the user interface 101, and/or may be a different size. For example, the drawer 130 may appear at a top of the user interface, or on either side of the user interface. In an embodiment, the location, size, and/or other appearance of the drawer 130 may be user-configurable.

Figure 2A:
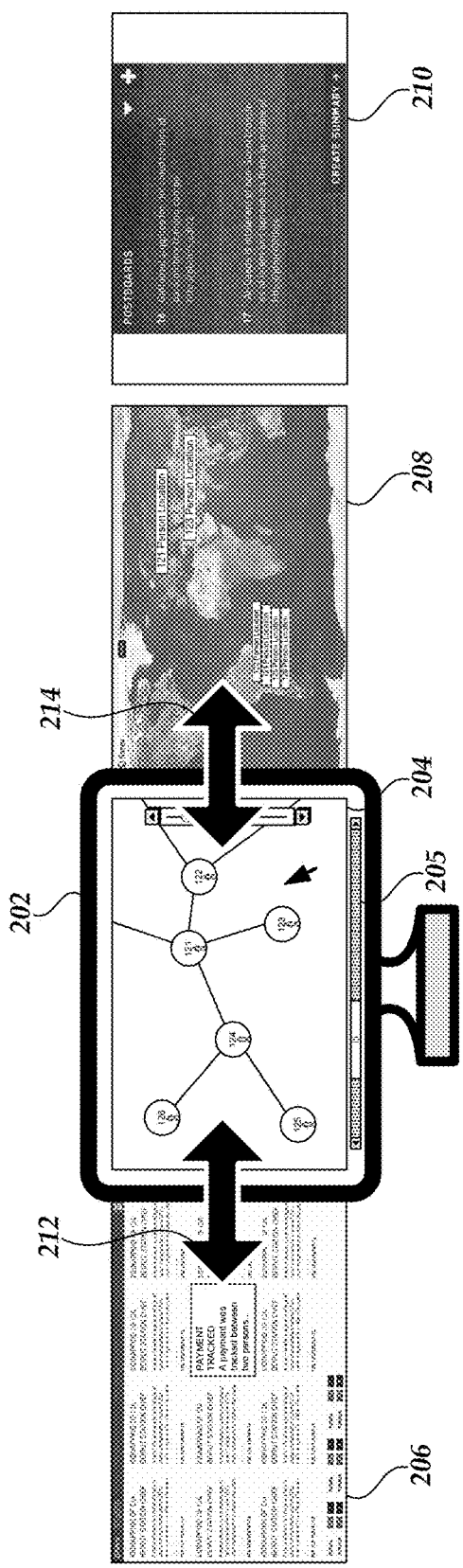

FIGS. 2A and 2B illustrate another example user interface of the context-sensitive viewing system including multiple contextual views, according to embodiments of the present disclosure. FIG. 2A includes a display 202 (for example, an electronic display associated with an electronic device), a scrollbar 205, and contextual views 204, 206, 208, and 210 corresponding to a graphical view, reader view, map view, and postboard view, respectively. A user of the context-sensitive viewing system views the primary graphical view 204 on the display 202, while the other views are not visible. The user may scroll and/or swipe (as with a touch interface) between the various views, as indicated by arrows 212, 214. The user may optionally use scrollbar 205 for scrolling between views.

FIG. 2B illustrates the user using mouse cursor 216 to scroll from the graphical view 204 to the reader view 206. Additional or fewer views may be available to the user. Additionally, in various embodiments multiple views may be arranged in other dimensions. For example, views may be laid out in a two-dimensional arrangement of rows and columns, and the display 202 may include a vertical scrollbar in addition to the horizontal scrollbar. In another embodiment, multiple views may be arranged in a three-dimensional arrangement, or any other arrangement suitable for user interaction with the context-sensitive viewing system.

In the embodiment of FIGS. 2A-2B, the user may interact with and/or manipulate the current, primary view as described above. Changes to the primary view are reflected in the secondary, non-visible views automatically, as described above with respect to the contextual previews of FIGS. 2C-2D. Additionally, as described above, in various embodiments changes may not be implemented in the non-visible views until they become visible to the user. Alternatively, adjacent views to the primary view may be updated more frequently (e.g. in realtime as changes are made to the primary view), while changes to non-adjacent views are made less frequently or not at all (e.g., a view may not be updated until it is adjacent to the primary view). In other embodiments, all views may be updated concurrently, such as in realtime, periodically, or in response to certain events.

FIGS. 2C and 2D illustrate alternative scrollbars that may be implemented in the context-sensitive viewing system, according to embodiments of the present disclosure. The scrollbars of FIGS. 2C and 2D may be implemented, for example, in the place of scrollbar 205 of FIGS. 2A and 2B.

In FIG. 2C the scrollbar 220 includes markers (or tick marks) 222 that indicate the locations of the various contextual views. Additionally, when mouse cursor 218 is placed over the scrollbar 220, a contextual preview 224 pops up. The preview 224 thereby provides the user with an indication of the particular view available at that location. In various embodiments, either markers 222 or pop up contextual preview 224, or both or neither, may be included in scrollbar 220.

In FIG. 2D the scrollbar includes contextual previews 230, 232, 234, and 236. A box indicator 228 indicates the currently viewable contextual view. For example, in FIG. 2D a graphical view corresponding to preview 232 is visible to the user. The user may use the mouse cursor 226 to move the indicator 228 along the scrollbar.

In an embodiment, multiple of the same type of contextual view may be accessible to the user. For example, timeline contextual views may be available.

Example Operations

Figure 3:
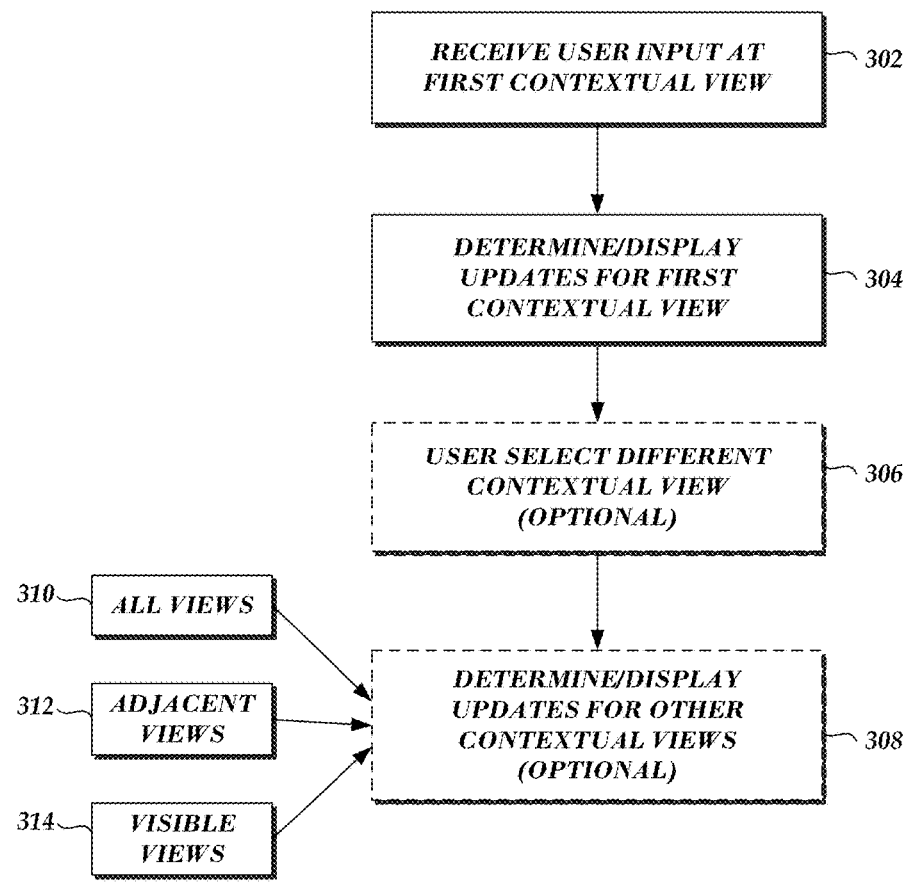
FIG. 3 is a flowchart depicting an illustrative operation of the context-sensitive viewing system, according to an embodiment of the present disclosure.

FIG. 3 is a flowchart depicting an illustrative operation of the context-sensitive viewing system, according to an embodiment of the present disclosure. In various embodiments, fewer blocks or additional blocks may be included in the process, or various blocks may be performed in an order different from that shown in FIG. 3. The various operations and functions described in FIG. 3 may, in various embodiments, be implemented by one or more modules of the context-sensitive viewing system.

At block 302, the context-sensitive viewing system receives user input at the first contextual view and/or data visualization user interface. In this present example, the first contextual view comprises the primary view with which the user is currently interacting. User inputs may include, for example, adding and/or deleting data objects, manipulating data objects, altering and/or editing data object properties and/or links, among other inputs.

At block 304, updates to the contextual view are determined by the context-sensitive viewing system based on the user input. For example, if the user provides an input to add a data object to the view, information associated with the data object to be added may be retrieved from a particular data store. The retrieved data object may then be displayed to the user and/or otherwise represented on the first/primary contextual view.

At block 306, the user may optionally select a different contextual view. Selecting a second contextual view may be accomplished in any of the ways described above in reference to the user interfaces of FIGS. 1A-1D and 2A-2D. For example, the user may drag objects from the first contextual view to a second contextual view. Alternatively, the user may click on or select a second contextual view. In another example, the user may scroll and/or slide the user interface to a second contextual view. In yet another embodiment, the user may drag one or more data objects onto another contextual view (as in the example of FIG. 1C). In an embodiment, block 306 may be optional. For example, in an embodiment, block 308 may follow block 304 without any user action.

At block 308, similar to block 304, updates to other contextual views may optionally be determined and displayed to the user. For example, when the user adds a data object to the first/primary contextual view, the same data object may be added to one or more other contextual views of the context-sensitive viewing system, as appropriate. In an example, when the user adds a person data object to a first graphical contextual view, the same person data object may be added to one or more other graphical contextual views. Further, the location(s) associated with that person data object may be added to one or more other map-based contextual views. Additionally, cables or other information, and/or user-generated snippets or notes associated with that person data object may be added to one or more other relevant contextual views.

The particular other contextual views that may be updated may depend on, for example, the particular implementation of the context-sensitive viewing system, user settings, and/or processing capability of the system. In an embodiment, at block 310, all other contextual views are updated simultaneously with, or very soon after, the updating of the first contextual. In another embodiment, at block 312, contextual views that are adjacent to the first view may be updated when the first view is updated. For example, in the embodiment of FIG. 2A, views that are immediately adjacent to the first, currently active view may be updated. Alternatively, views that are near the current view, for example, two or three away from the current view, may be updated. In yet another embodiment, at block 314, any visible contextual views may be updated. For example, in the preview drawer embodiment of FIG. 1D, or the scrollbar of FIG. 2D, any previews that are currently visible on the display may be updated. Alternatively, visible previews may be updated when the drawer is opened. In another alternative, hidden previews when the drawer is closed may be updated such that the updated previews may be visible when the drawer is opened. In another example, as in the embodiment of FIG. 2B, as the user scrolls or slides from one view to the next, the next view may be updated when it becomes visible to the user. In another example, as in the embodiment of FIG. 2C, the popup preview may be updated when it becomes visible to the user. Any combination of the above described examples may be implemented in the context-sensitive viewing system.

In an embodiment, updating of other contextual views is determined based on processing capability available to the context-sensitive viewing system. For example, additional contextual views may be updated when more processing capability is available. In another example, updates to particular contextual views may be delayed until visible to the user so as to reduce power consumption and/or processing power.

Implementation Mechanisms

Figure 4A:
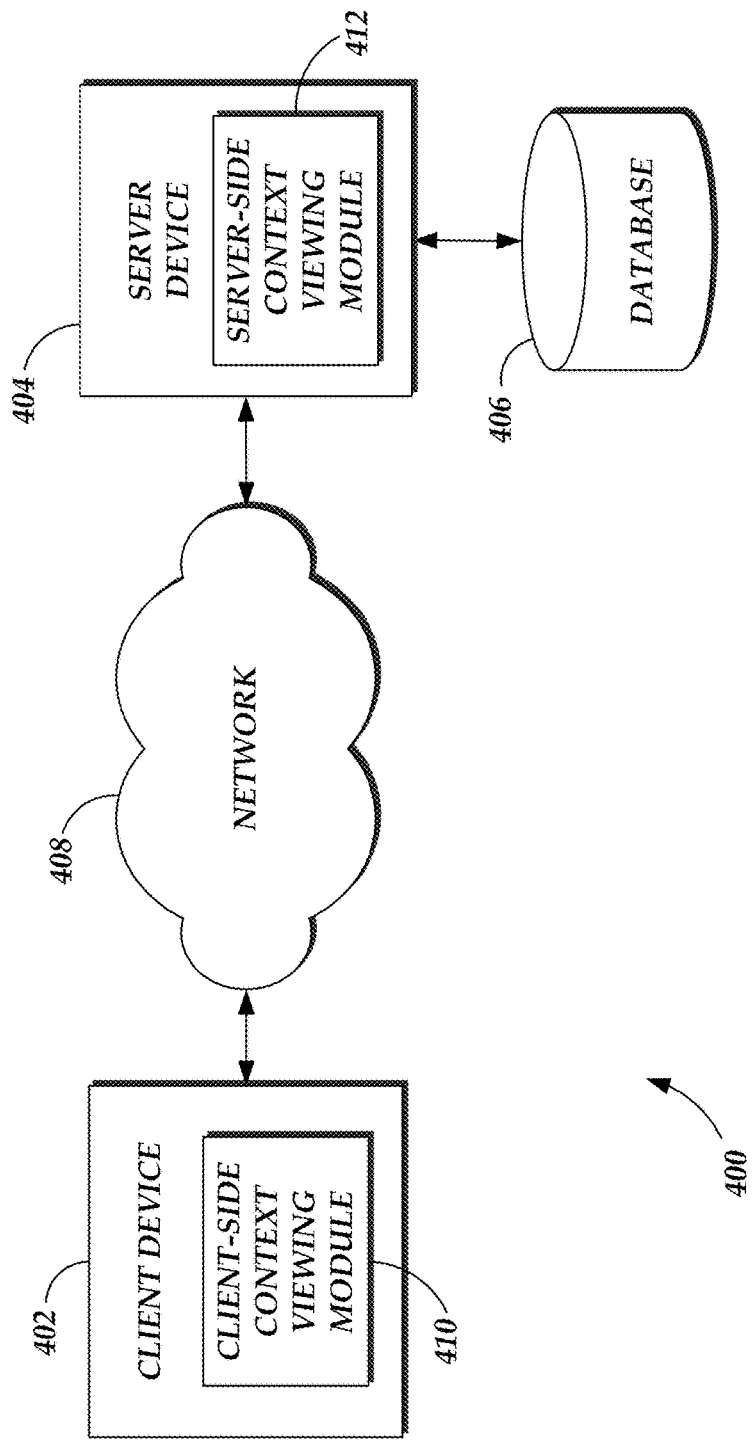
FIG. 4A illustrates a network environment in which the context-sensitive viewing system may operate, according to an embodiment of the present disclosure.

Turning to FIG. 4A, an illustrative network environment 400 in which the context-sensitive viewing system may operate, according to an embodiment of the present disclosure, is shown. The network environment 400 may include a client device 402, a network 408, a server device 404, and a database 406. The constituents of the network environment 400 may be in communication with each other either locally or over the network 408.

The client device 402 may be any computing device capable of receiving input and providing output to a user. For example, the client device 402 may provide a contextual view of a data visualization to the user, among other functions. The client device 402 may also be capable of communicating over the network 408, for example, to request data objects, data visualization information, and/or contextual view information from the server device 404. In some embodiments, the client device 402 may include non-transitory computer-readable medium storage for storing data objects, data visualization information, and/or contextual view information. In an embodiment, the context-sensitive viewing system may include a plurality of client devices, each of which may communicate with each other, and with the network 408.

The network 408 may be any wired network, wireless network, or combination thereof. In addition, the network 408 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The server device 404 is a computing device that may perform a variety of tasks to implement the contextual views and data visualizations of the context-sensitive viewing system. For example, the server device 404 may generate a user interface, including various contextual views, for display to the user via the client device 402. Alternatively, the server device 404 may receive requests for data and/or data objects from the client device 402, and may provide the requested data to the client device 402. The server device 404 may also generate requested data visualizations and/or contextual views that may be transmitted over the network 408, and provided to the user via the client device 402. Additional operations of the server device 404 and/or the client device 402 are described in further detail with respect to FIG. 4B.

The server device 404 may be in communication with the database 406. The database 406 may store one or more data objects, data visualization information, and/or contextual view information. The database 406 may be embodied in hard disk drives, solid state memories, and/or any other type of non-transitory, computer-readable storage medium remotely or locally accessible to the server device 404. The database 406 may also be distributed or partitioned across multiple storage devices as is known in the art without departing from the spirit and scope of the present disclosure.

FIG. 4A further illustrates that client device 402 includes a client-side context viewing module 410 and server device 404 includes a server-side context viewing module 412. Either of the context viewing modules 410, 412 may be configured to implement the various aspects of the context-sensitive viewing system as described herein. For example, in various embodiments, either of the context viewing modules 410, 412 may implement the user interface and/or various data visualizations and contextual views of the context-sensitive viewing system. As described in further detail in reference to FIG. 4B below, context viewing modules 410, 412 may comprise software, and may be stored in one or more computer-readable media of the client device 402 and/or server device 404. In other embodiments, context viewing modules 410, 412 may comprise hardware modules. Further, in various embodiments, context viewing modules 410, 412 may comprise additional modules that may implement the functionality of the context-sensitive viewing system. Functionality discussed above with reference to the client device and the server device may be changed to other devices (e.g., functions discussed with reference to the server device may be performed by the client device and/or vice versa) in various embodiments.

According to various embodiments, the techniques described herein may be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s), such as the client device 402 and/or the server device 404, are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, a computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4B:
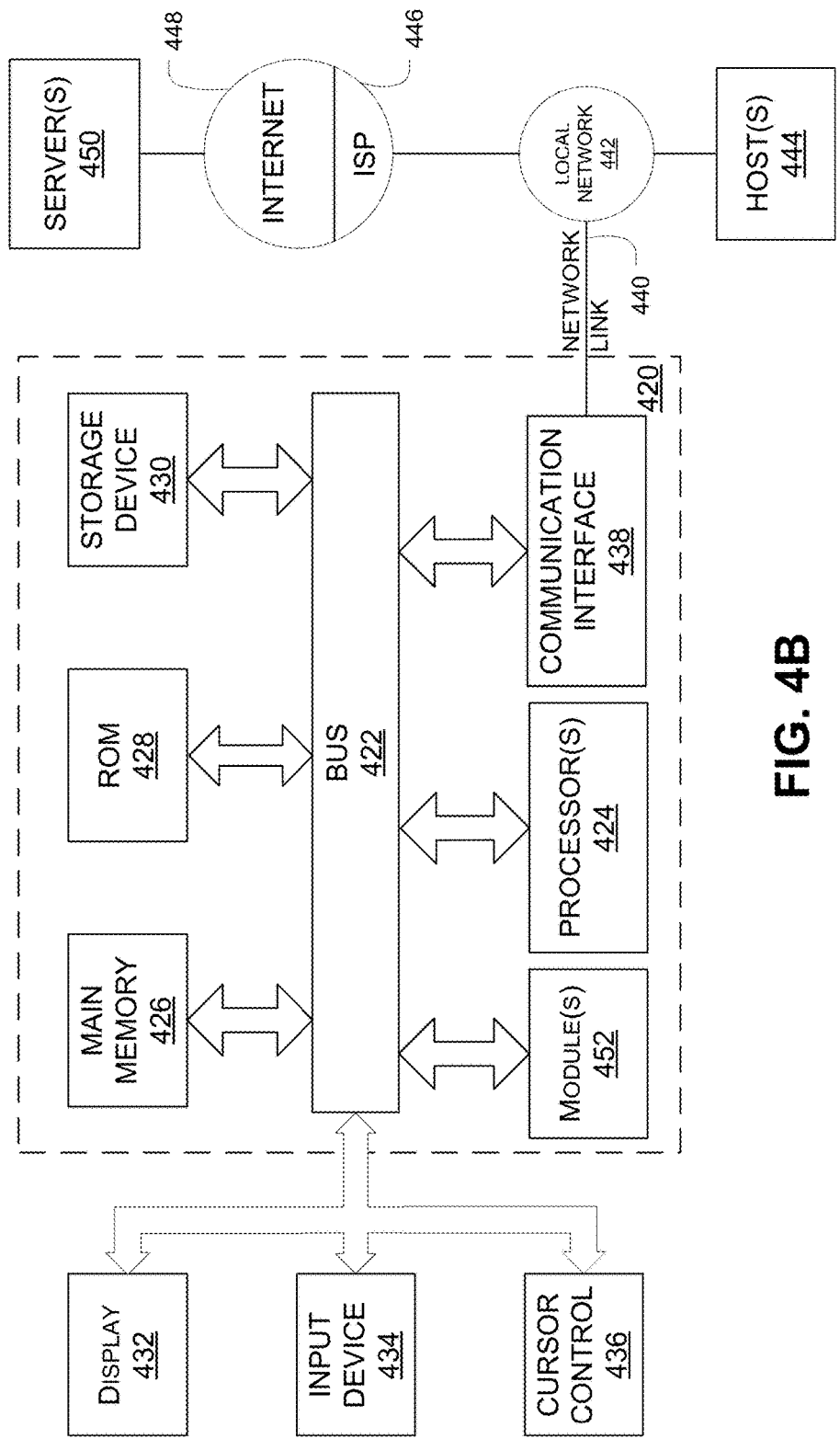
FIG. 4B illustrates a computer system with which certain methods discussed herein may be implemented, according to embodiments of the present disclosure.

For example, FIG. 4B is a block diagram that illustrates a computer system 420 upon which systems and methods discussed herein may be implemented. Computer system 420 includes a bus 422 or other communication mechanism for communicating information, and a hardware processor, or multiple processors, 424 coupled with bus 422 for processing information. Hardware processor(s) 424 may be, for example, one or more general purpose microprocessors. In various embodiments, one or more components of the computer system 420 may be included in the client device 402 and/or the server device 404 of FIG. 4A. In an embodiment, the client device 402 may be embodied in the computer system 420, while in another embodiment the server device 404 may be embodied in the computer system 420.

Computer system 420 also includes a main memory 426, such as a random access memory (RAM), cache and/or other dynamic storage devices, coupled to bus 422 for storing information and instructions to be executed by processor 424. Main memory 426 also may be used for storing temporary variables or other intermediate information during execution of instructions to be executed by processor 424. Such instructions, when stored in storage media accessible to processor 424, render computer system 420 into a special-purpose machine that is customized to perform the operations specified in the instructions.

Computer system 420 further includes a read only memory (ROM) 428 or other static storage device coupled to bus 422 for storing static information and instructions for processor 424. A storage device 430, such as a magnetic disk, optical disk, or USB thumb drive (Flash drive), etc., is provided and coupled to bus 422 for storing information and instructions.

Computer system 420 may be coupled via bus 422 to a display 432, such as a cathode ray tube (CRT) or LCD display (or touch screen), for displaying information to a computer user. An input device 434, including alphanumeric and other keys, is coupled to bus 422 for communicating information and command selections to processor 424. Another type of user input device is cursor control 436, such as a mouse, a trackball, or cursor direction keys for communicating direction information and command selections to processor 424 and for controlling cursor movement on display 432. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computer system 420 may also include one or more modules 452 that may, as described above and below, provide various functionality of the context-sensitive viewing system. For example, one module 452 may comprise the client-side context viewing module 410 of FIG. 4A, and may implement a graphical user interface on the client device 402. Module(s) 452 may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 420 may implement the techniques described herein using customized hard-wired logic, one or more ASICs or FPGAs, firmware and/or program logic which in combination with the computer system causes or programs computer system 420 to be a special-purpose machine. According to one embodiment, the techniques herein are performed by computer system 420 in response to processor(s) 424 executing one or more sequences of one or more instructions contained in main memory 426. Such instructions may be read into main memory 426 from another storage medium, such as storage device 430. Execution of the sequences of instructions contained in main memory 426 causes processor(s) 424 to perform the process steps described herein. In alternative embodiments, hard-wired circuitry may be used in place of or in combination with software instructions.

The terms "non-transitory media," "computer-readable media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 430. Volatile media includes dynamic memory, such as main memory 426. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 422. Transmission media can also take the form of acoustic or light waves, such as those generated during radio-wave and infra-red data communications.

Various forms of media may be involved in carrying one or more sequences of one or more instructions to processor 424 for execution. For example, the instructions may initially be carried on a magnetic disk or solid state drive of a remote computer. The remote computer can load the instructions into its dynamic memory and send the instructions over a telephone line using a modem. A modem local to computer system 420 can receive the data on the telephone line and use an infra-red transmitter to convert the data to an infra-red signal. An infra-red detector can receive the data carried in the infra-red signal and appropriate circuitry can place the data on bus 422. Bus 422 carries the data to main memory 426, from which processor 424 retrieves and executes the instructions. The instructions received by main memory 426 may retrieve and execute the instructions. The instructions received by main memory 426 may optionally be stored on storage device 430 either before or after execution by processor 424.

Computer system 420 also includes a communication interface 438 coupled to bus 422. Communication interface 438 provides a two-way data communication coupling to a network link 440 that is connected to a local network 442. For example, communication interface 438 may be an integrated services digital network (ISDN) card, cable modem, satellite modem, or a modem to provide a data communication connection to a corresponding type of telephone line. As another example, communication interface 438 may be a local area network (LAN) card to provide a data communication connection to a compatible LAN (or WAN component to communicate with a WAN). Wireless links may also be implemented. In any such implementation, communication interface 438 sends and receives electrical, electromagnetic or optical signals that carry digital data streams representing various types of information.

Network link 440 typically provides data communication through one or more networks (for example, network 408 of FIG. 4A) to other data devices. For example, network link 440 may provide a connection through local network 442 to a host computer 444 or to data equipment operated by an Internet Service Provider (ISP) 446. ISP 446 in turn provides data communication services through the world wide packet data communication network now commonly referred to as the "Internet" 448. Local network 442 and Internet 448 both use electrical, electromagnetic or optical signals that carry digital data streams. The signals through the various networks, on network link 440, and through communication interface 438, which carry the digital data to and from computer system 420, are example forms of transmission media.

Computer system 420 can send messages and receive data, including program code, through the network(s), network link 440 and communication interface 438. In the Internet example, a server 450 might transmit a requested code for an application program through Internet 448, ISP 446, local network 442 and communication interface 438.

The received code may be executed by processor 424 as it is received, and/or stored in storage device 430, or other non-volatile storage for later execution.

In an embodiment, the context-sensitive viewing system is implemented by the computer system 420. For example, data objects, data visualization information, and/or contextual view information may be stored in the storage device 430, and/or in an external database accessible through the local network 442 (for example, database 406 of FIG. 4A). The user interfaces and/or operations of the context-sensitive viewing system may be implemented by modules 452 stored in the main memory 426, the ROM 428, and/or the storage device 430, and executed by the processor(s) 424.

The context-sensitive viewing system advantageously enables a user to view a particular set of data objects in multiple visualization contexts. Previews of the set of data in other visualization may be quickly reviewed by the user to determine the most beneficial context for information extraction. Further, manipulations by the user in one context are propagated to the other contexts, allowing fast analysis of the impacts of changes to the set of data.

Object Centric Data Model

Figure 5:
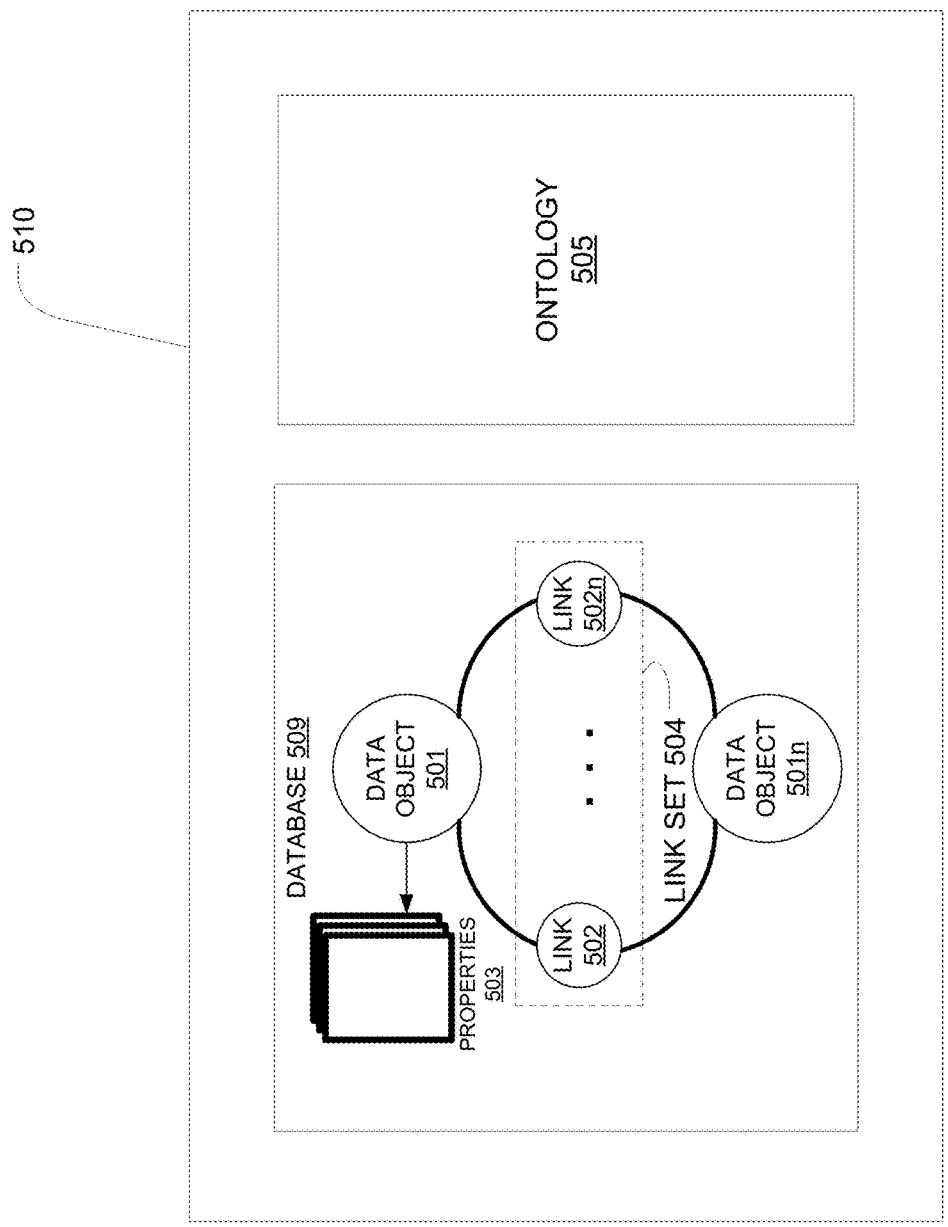
FIG. 5 illustrates an embodiment of a database system using an ontology.

FIG. 5 illustrates an object-centric conceptual data model including an example database system 510 using an ontology 505. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 505. The conceptual data model is independent of any particular database used for durably storing one or more database(s) 509 based on the ontology 505. For example, each object of the conceptual data model may correspond to one or more rows in a relational database or an entry in Lightweight Directory Access Protocol (LDAP) database, or any combination of one or more databases.

An ontology 505, as noted above, may include stored information providing a data model for storage of data in the database 509. The ontology 505 may be defined by one or more object types, which may each be associated with one or more property types. At the highest level of abstraction, data object 501 is a container for information representing things in the world. For example, data object 501 can represent an entity such as a person, a place, an organization, a market instrument, or other noun. Data object 501 can represent an event that happens at a point in time or for a duration. Data object 501 can represent a document or other unstructured data source such as an e-mail message, a news report, or a written paper or article. Each data object 501 is associated with a unique identifier that uniquely identifies the data object within the database system.

Different types of data objects may have different property types. For example, a "Person" data object might have an "Eye Color" property type and an "Event" data object might have a "Date" property type. Each property 503 as represented by data in the database system 510 may have a property type defined by the ontology 505 used by the database 505.

Objects may be instantiated in the database 509 in accordance with the corresponding object definition for the particular object in the ontology 505. For example, a specific monetary payment (e.g., an object of type "event") of US$30.00 (e.g., a property of type "currency") taking place on Mar. 27, 2009 (e.g., a property of type "date") may be stored in the database 509 as an event object with associated currency and date properties as defined within the ontology 505.

The data objects defined in the ontology 505 may support property multiplicity. In particular, a data object 501 may be allowed to have more than one property 503 of the same property type. For example, a "Person" data object might have multiple "Address" properties or multiple "Name" properties.

Each link 502 represents a connection between two data objects 501. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 501 can have multiple links with another data object 501 to form a link set 504. For example, two "Person" data objects representing a husband and a wife could be linked through a "Spouse Of" relationship, a matching "Address" property, and one or more matching "Event" properties (e.g., a wedding). Each link 502 as represented by data in a database may have a link type defined by the database ontology used by the database.

Figure 6:
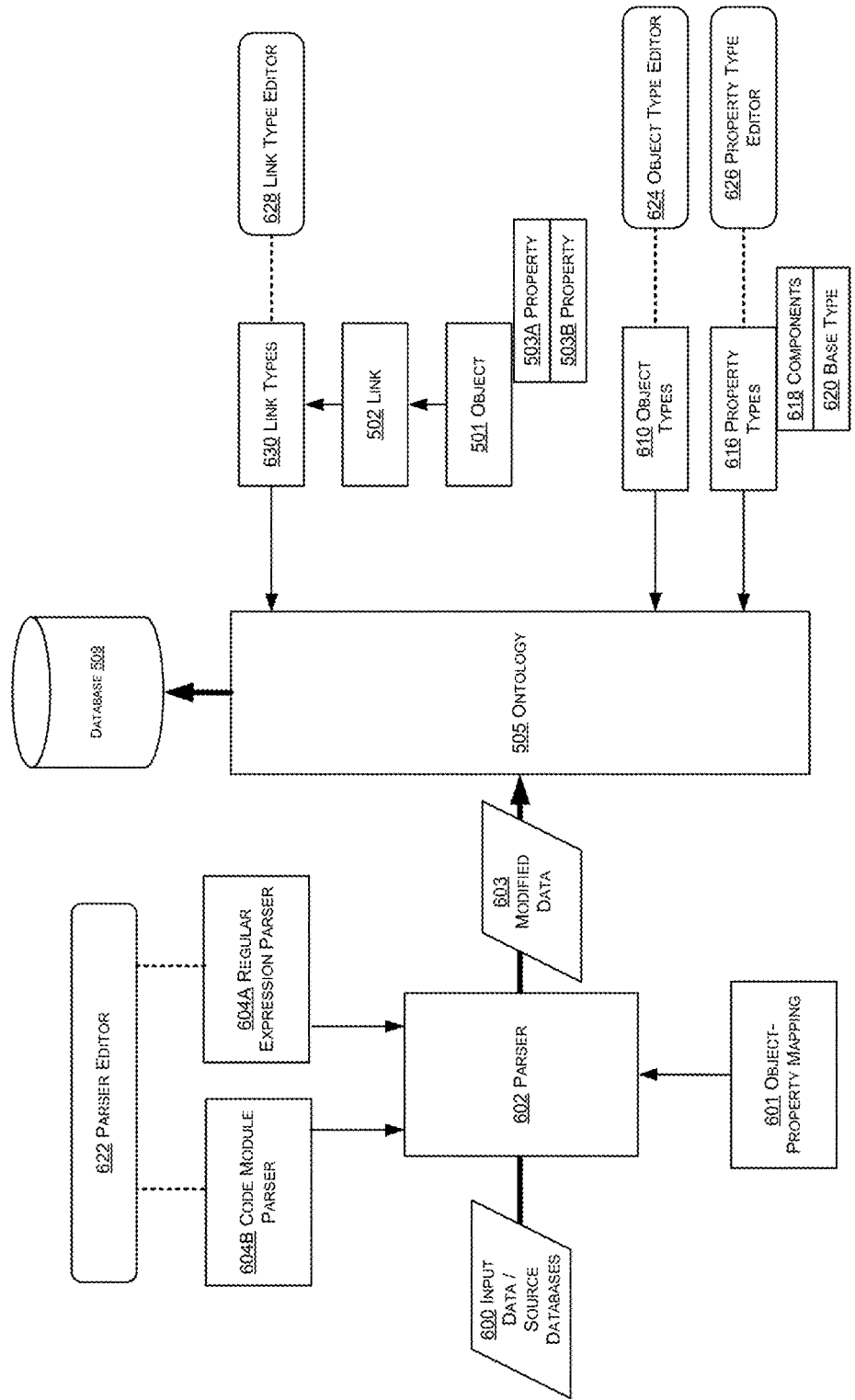
FIG. 6 illustrates an embodiment of a system for creating data in a data store using a dynamic ontology.

FIG. 6 is a block diagram illustrating exemplary components and data that may be used in identifying and storing data according to an ontology. In this example, the ontology may be configured, and data in the data model populated, by a system of parsers and ontology configuration tools. In the embodiment of FIG. 6, input data 600 is provided to parser 602. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 602 is able to read a variety of source input data types and determine which type of data it is reading.

In accordance with the discussion above, the example ontology 505 comprises stored information providing the data model of data stored in database 509, and the ontology is defined by one or more object types 610, one or more property types 616, and one or more link types 630. Based on information determined by the parser 602 or other mapping of source input information to object type, one or more data objects 501 may be instantiated in the database 509 based on respective determined object types 610, and each of the objects 501 has one or more properties 503 that are instantiated based on property types 616. Two data objects 501 may be connected by one or more links 502 that may be instantiated based on link types 630. The property types 616 each may comprise one or more data types 618, such as a string, number, etc. Property types 616 may be instantiated based on a base property type 620. For example, a base property type 620 may be "Locations" and a property type 616 may be "Home."

In an embodiment, a user of the system uses an object type editor 624 to create and/or modify the object types 610 and define attributes of the object types. In an embodiment, a user of the system uses a property type editor 626 to create and/or modify the property types 616 and define attributes of the property types. In an embodiment, a user of the system uses link type editor 628 to create the link types 630. Alternatively, other programs, processes, or programmatic controls may be used to create link types and property types and define attributes, and using editors is not required.

In an embodiment, creating a property type 616 using the property type editor 626 involves defining at least one parser definition using a parser editor 622. A parser definition comprises metadata that informs parser 602 how to parse input data 600 to determine whether values in the input data can be assigned to the property type 616 that is associated with the parser definition. In an embodiment, each parser definition may comprise a regular expression parser 604A or a code module parser 604B. In other embodiments, other kinds of parser definitions may be provided using scripts or other programmatic elements. Once defined, both a regular expression parser 604A and a code module parser 604B can provide input to parser 602 to control parsing of input data 600.

Using the data types defined in the ontology, input data 600 may be parsed by the parser 602 determine which object type 610 should receive data from a record created from the input data, and which property types 616 should be assigned to data from individual field values in the input data. Based on the object-property mapping 601, the parser 602 selects one of the parser definitions that is associated with a property type in the input data. The parser parses an input data field using the selected parser definition, resulting in creating new or modified data 603. The new or modified data 603 is added to the database 509 according to ontology 505 by storing values of the new or modified data in a property of the specified property type. As a result, input data 600 having varying format or syntax can be created in database 509. The ontology 505 may be modified at any time using object type editor 624, property type editor 626, and link type editor 628, or under program control without human use of an editor. Parser editor 622 enables creating multiple parser definitions that can successfully parse input data 600 having varying format or syntax and determine which property types should be used to transform input data 600 into new or modified input data 603.

The properties, objects, and links (e.g. relationships) between the objects can be visualized using a graphical user interface (GUI). For example, as described above, FIG. 1A displays a user interface showing a graph representation of relationships between the data objects that are represented as nodes. Further, as described above, relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

Additional Implementation Details

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
    an electronic database configured to store a plurality of data objects and properties associated with each of the data objects; and
    one or more hardware processors in communication with a computer readable medium storing software instructions that are executable by the one or more hardware processors in order to cause the one or more hardware processors to:

generate a primary contextual view including a primary visualization of a set of data objects and associated properties, wherein the primary contextual view is interactive;

generate one or more secondary contextual views distinct from the primary contextual view, wherein:
- each secondary contextual view includes respective secondary visualizations of the set of data objects,
- each of the secondary visualizations is distinct from the primary visualization, and
- the one or more secondary contextual views are interactive;

provide a user input mechanism useable for causing display of different ones of the one or more secondary contextual views and/or the primary contextual view, wherein the user input mechanism includes at least one of: a scrollbar, a scroll input, or a swipe input; and in response to receiving a user input interacting with a data object in the primary contextual view, cause a corresponding interaction with a corresponding data object in one or more of the secondary contextual views.

2. The computer system of claim 1, wherein the user input interacting with the data object comprises a selection of the data object, and wherein the corresponding interaction comprises a selection of the corresponding data object.

3. The computer system of claim 1, wherein the data object and the corresponding data object comprise two visual representations of a same data object.

4. The computer system of claim 1, wherein the software instructions that are executable by the one or more hardware processors in order to cause the one or more hardware processors to further:
further in response to receiving the user input, determine the one or more of the secondary contextual views in which to cause the corresponding interaction.

5. The computer system of claim 4, wherein causing the corresponding interaction comprises causing the corresponding interaction in all of the secondary contextual views.

6. The computer system of claim 4, wherein causing the corresponding interaction comprises causing the corresponding interaction in any of the secondary contextual views that are currently viewable by a user.

7. The computer system of claim 4, wherein causing the corresponding interaction comprises causing the corresponding interaction in any of the secondary contextual views that are immediately adjacent to the primary contextual view.

8. The computer system of claim 1, wherein each of the primary visualization and/or the secondary visualizations include at least one of: a graph, a map, a table, a timeline, a histogram, a list, a reader interface, or a postboard interface.

9. The computer system of claim 1, wherein the one or more secondary contextual views are substantially the same size as the primary contextual view.

10. The computer system of claim 1, wherein a user input interacting with the data object in the primary contextual view comprises at least one of: adding the data object, removing the data object, modifying the data object, moving the data object, modifying properties associated with the data object, or modifying and/or manipulating links between the data object and one or more other data objects.

11. The computer system of claim 1, wherein the one or more secondary contextual views comprise two or more secondary contextual views, and wherein the software instructions that are executable by the one or more hardware processors in order to cause the one or more hardware processors to further:
cause the two or more secondary contextual views to be positioned side-by-side one another in a user interface.

12. The computer system of claim 11, wherein the software instructions that are executable by the one or more hardware processors in order to cause the one or more hardware processors to further:
cause the primary contextual view to be positioned side-by-side the two or more secondary contextual views in the user interface.

13. The computer system of claim 1, wherein the user input mechanism comprises a scrollbar, and wherein the scrollbar includes indications corresponding to each of the primary contextual view and the one or more secondary contextual views.

14. The computer system of claim 13, wherein the indications comprise at least one of: tick marks or thumbnail previews.

15. The computer system of claim 1, wherein the user input mechanism comprises a scrollbar, and wherein the software instructions that are executable by the one or more hardware processors in order to cause the one or more hardware processors to further:
provide the one or more secondary contextual views in the scrollbar.

16. The computer system of claim 1, wherein the software instructions that are executable by the one or more hardware processors in order to cause the one or more hardware processors to further:
provide the one or more secondary contextual views in an interactive drawer of a user interface.

17. The computer system of claim 16, wherein the one or more secondary contextual views comprise at least one of previews or thumbnails.

18. The computer system of claim 16, wherein the interactive drawer may be opened and closed in the user interface.

19. The computer system of claim 1, wherein each of the secondary visualizations is distinct from one another.

* * * * *